Oct. 17, 1933.                R. R. SEARLES                1,931,328
                                 CHUCK
                           Filed Jan. 7, 1931           2 Sheets-Sheet 1
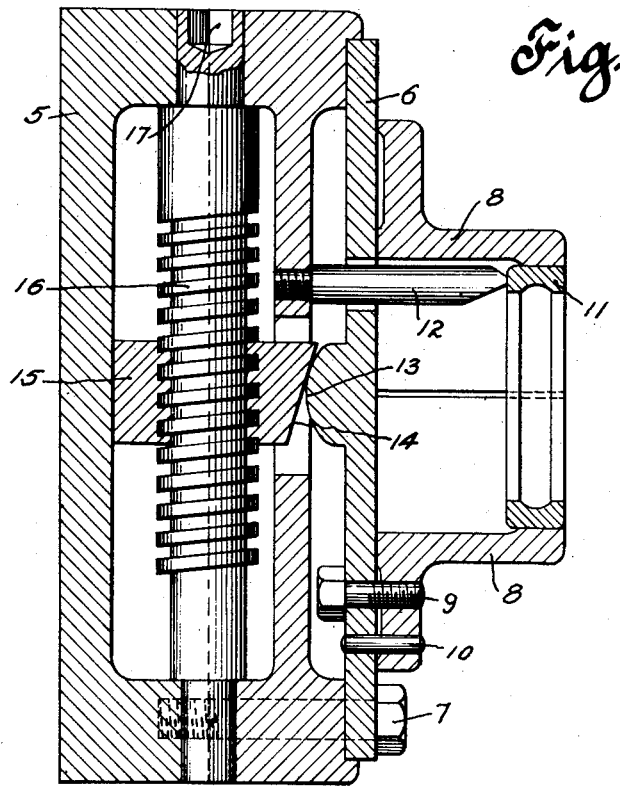
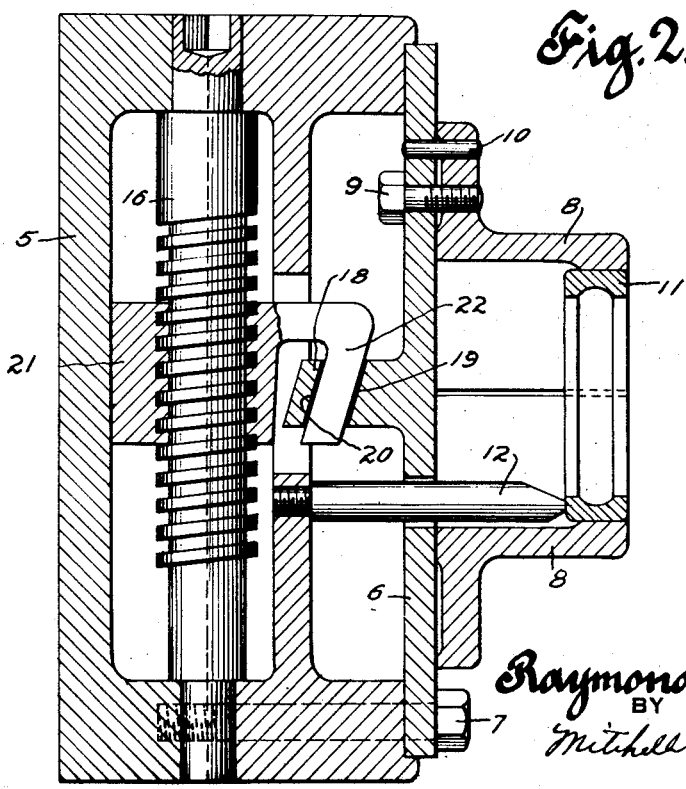
INVENTOR
Raymond R. Searles
BY
Mitchell Berhut
ATTORNEYS Oct. 17, 1933.    R. R. SEARLES    1,931,328
CHUCK
Filed Jan. 7, 1931    2 Sheets-Sheet 2
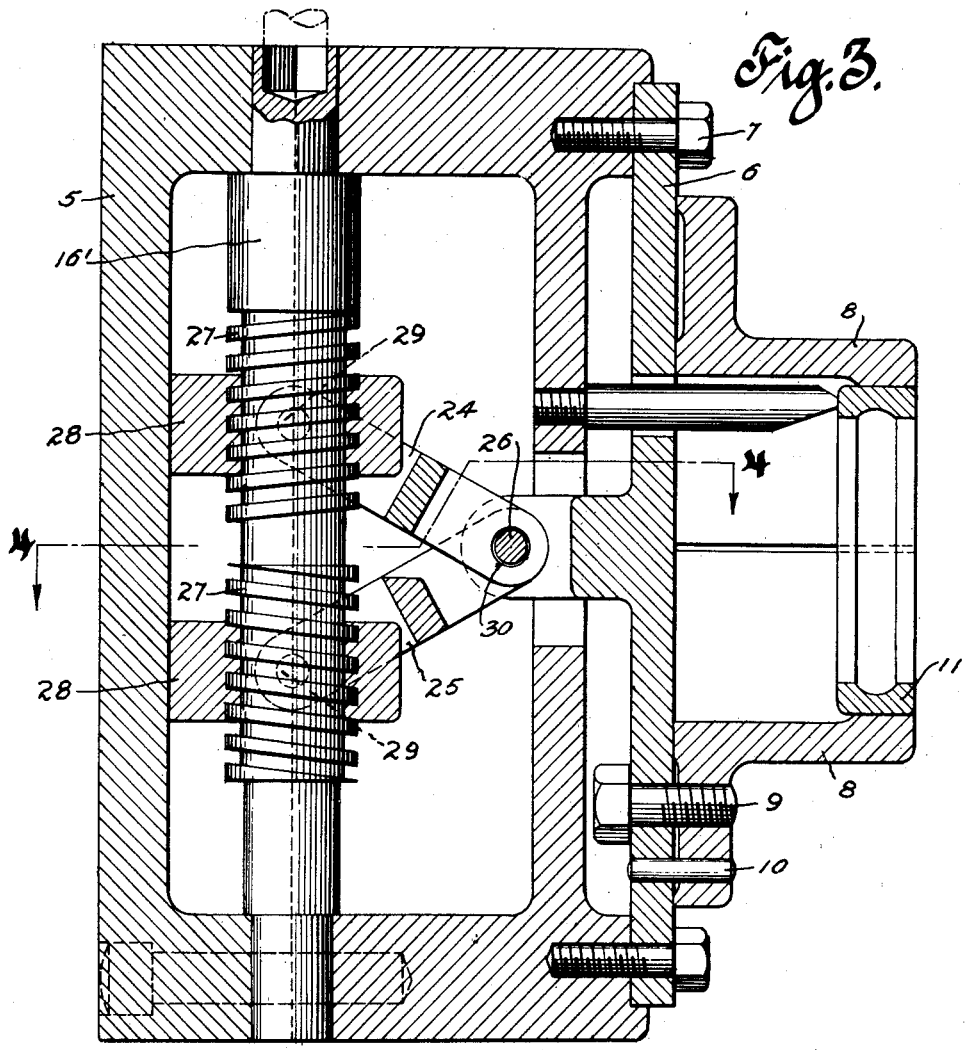
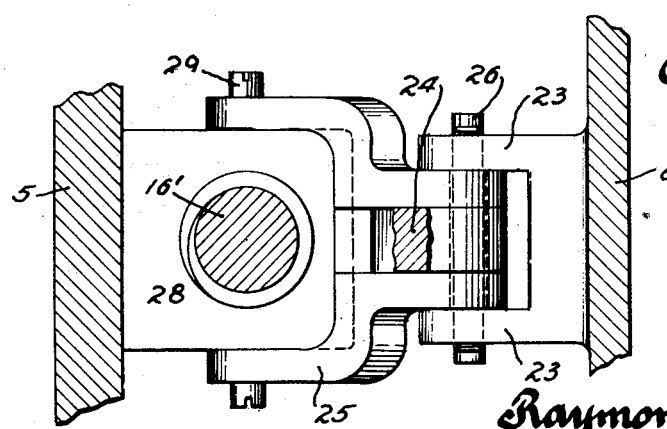

Patented Oct. 17, 1933

1,931,328

UNITED STATES PATENT OFFICE 1,931,328

CHUCK

Raymond R. Searles, New Britain, Conn., assignor to The Fafnir Bearing Company, New Britain, Conn., a corporation of Connecticut Application January 7, 1931. Serial No. 507,185

10 Claims. (Cl. 279—46)

My invention relates to a gripping device such as a chuck or a vise involving a flexible diaphragm, and more particularly to improved means for actuating the diaphragm. Scaife Patent, No. 1,389,272, dated August 30, 1921, discloses a diaphragm chuck involving an actuating rod passing longitudinally through the chuck body and the spindle carrying the chuck for flexing the diaphragm. My invention is applicable to a similar type of chuck and also to a vise or other gripping device.

It is an object of the invention to provide a diaphragm gripping device having improved compact actuating means for the diaphragm.

It is a further object to provide a diaphragm gripping device in which all parts, including the diaphragm and actuating mechanism, are self-contained and may be handled as a unit.

Other objects and features of the invention will become apparent or will be hereinafter pointed out.

Briefly stated, in a preferred form of the invention I provide a body member having a diaphragm secured thereto. The diaphragm carries gripping jaws whereby upon flexing of the diaphragm the jaws will be moved to gripping or releasing position. Carried by the body is an actuator which may be in the form of screw means for operating a member which flexes the diaphragm upon actuation of the screw means.

In the drawings, which show, for illustrative purposes only, preferred forms of the invention—

Fig. 1 is a central sectional view of a gripping device illustrating features of the invention;

Fig. 2 is a view similar to Fig. 1, but illustrating a modified construction;

Fig. 3 is a view similar to Fig. 1, but illustrating a different diaphragm flexing mechanism;

Fig. 4 is a sectional view taken substantially in the plane of the line 4—4 of Fig. 3.

In said drawings, 5 indicates a body which may be a chuck body or body portion of a vise or other gripping device. The body 5 may be secured to a spindle when it is desired to have the gripping device rotate, or may be on a fixed part such as a turret, or on a bench when rotation is not necessary. A diaphragm 6 is secured to the body 5 as by means of cap screws or bolts such as 7. The diaphragm carries gripping jaws 8—8, which, in the form shown, are separately formed members secured to the diaphragm as by means of screws 9 and dowels 10. The gripping jaws in all forms illustrated are arranged for external gripping, but it will be readily understood without illustration that these jaws may be arranged for internal gripping.

In all of the forms illustrated, it will be clear that flexure of the center of the diaphragm toward the right will cause the jaws 8—8 to open and release the work piece such as the bearing ring 11 held therein. Upon release of the diaphragm, or upon positive movement toward the left, the jaws 8 will move inwardly to grip the external surface of the work piece 11. When the jaws are arranged for internal gripping, the diaphragm would be moved toward the left to cause the jaws to move inwardly to release the work piece and would be moved toward the right for gripping the work piece.

Suitable work stops may be provided for locating the work pieces with any desired degree of accuracy. In the form shown, work stops such as one or more pins 12 are secured to the chuck body and project through apertures in the diaphragm to serve as work stops. Obviously, other forms of work stops could be employed.

In the particular form shown in Fig. 1, the diaphragm is provided with a projecting boss or button 13 to be engaged by the cam surface 14 on the movable block member 15. The block member is internally threaded to fit upon and be actuated by the screw member 16 journaled at the ends in the body. The screw may be held in any suitable manner, but I have illustrated the body 5 as being split on a plane through the screw axis so that when the two body parts are secured together as by means of the diaphragm securing screw 7, the screw 16 will be held in place. The screw may be actuated as by means of a wrench to fit in the angular socket 17 at one end of the screw.

When the screw 16 is rotated to move the block 15 downwardly, the cam surface 14 engaging the button 13 will flex the diaphragm 6 outwardly and cause the jaws 8 to release the work piece 11. Upon movement of the actuating block 15 in the opposite direction, the cam surface 14 will permit the button 13 to move toward the left, and the spring of the diaphragm will return the jaws 8 to the position shown, which is the gripping position. The block 15 is restrained from rotary movement as by means of its flat rear surface fitting against the rear surface of the body 5.

In the form shown in Fig. 2, the diaphragm 6 is provided with a projecting lug 18 which has two opposed cam surfaces 19—20. The actuating block 21, corresponding in general to the block 15 of Fig. 1, is provided with an arm 22 having cam surfaces for engagement with either of the surfaces 19 and 20. A slight clearance is preferably provided between the sides of the actuating arm 22 and the surfaces 19—20 to provide predetermined lost motion for the purpose hereinafter described.

When the screw 16 of Fig. 2 is moved to lower the sliding block 21, the cam surface 19 will be engaged by the arm 22 and the diaphragm will be flexed outwardly to release the work piece 11. Upon movement of the block 21 upwardly, the diaphragm will spring back and the surface 19 will follow the arm 22 until the work piece is gripped or the diaphragm has come to its position of equilibrium. Further movement of the block 21 upwardly will cause the back surface of the arm 22 to engage the cam surface 20 and positively flex the diaphragm 6 rearwardly. The arrangement shown in Fig. 2 is therefore admirably adapted for securing a more positive grip in that the diaphragm may be positively flexed in the gripping direction. The slight clearance or lost motion between the cam surfaces 19—20 and the arm 22 renders it easy to determine by the "feel" when the work piece is gripped, for the reason that the screw 16 will be more freely rotatable when the arm 22 is not engaging either the surface 19 or 20.

In that form shown in Fig. 3, the diaphragm is provided with lugs or ears 23—23, to which are pivotally secured link mechanism, preferably two links 24—25. A pin 26 serves to connect the ears 23 with the links. The screw member 16' in this case is provided with right and left-hand screws 27—27 on which are threaded the nuts 28—28 corresponding in general to the actuators 15—21 of Figs. 1 and 2. The links 24 and 25 are pivotally secured to the nuts 28—28 as by means of pins 29—29. In the linkage is preferably some lost motion, for example a substantial looseness between the pin 26 and the links 24—25 as indicated at 30.

It will be seen that when the nuts 28—28 are moved toward each other, the links 24—25 will flex the diaphragm 6 outwardly to cause the jaws to release the work piece. Upon movement of the nuts 28—28 away from each other, the diaphragm will spring back to gripping position and upon further separating movement of the nuts 28—28, after taking up the slack in the lost motion mechanism, the diaphragm may be positively flexed toward the left for a tighter gripping of the work piece. This arrangement is also adapted for internal gripping. The lost motion mechanism here again is a convenience, in that by the "feel" of the operation of the screw member 16' it can be determined when the work piece is properly gripped.

While the invention has been described in considerable detail and various modifications illustrated, it is to be understood that various other modifications may be made and the invention may be embodied otherwise than as herein shown, all within the scope of the invention as defined in the appended claims.

I claim:

1. In a device of the character indicated, a body member, a diaphragm secured thereto, gripping jaws on said diaphragm, and means movable in a direction substantially parallel to said diaphragm and connected to said diaphragm for flexing the latter.

2. In a device of the character indicated, a body, screw means in said body, a diaphragm secured to said body, gripping jaws carried by said diaphragm, said diaphragm and screw means being substantially parallel to each other, and means connecting said screw means and diaphragm for flexing the latter upon actuation of said screw means.

3. In a device of the character indicated, a body, a diaphragm, gripping jaws carried by said diaphragm, and cam means movable along said diaphragm and engaging a part thereof for flexing said diaphragm.

4. In a device of the character indicated, a body, a diaphragm secured thereto, gripping jaws carried by said diaphragm, a projection on said diaphragm and cam means in said body engageable with said projection and movable for flexing said diaphragm.

5. In a device of the character indicated, a body, a diaphragm secured thereto, gripping jaws carried by said diaphragm, and cam means movable in a direction substantially parallel to said diaphragm for flexing said diaphragm in both directions.

6. In a device of the character indicated, a body, a diaphragm secured thereto, gripping jaws carried by said diaphragm, a link secured at one end to said diaphragm, means for restraining movement of the opposite end of said link in a direction at right angles to said diaphragm, and moving said last mentioned end of said link in a direction substantially parallel to said diaphragm for flexing the latter, said means being fixed against endwise movement.

7. In a device of the character indicated, a body, a diaphragm secured thereto, gripping jaws carried by said diaphragm, a screw in said body, a non-rotatable nut on said screw, link means connecting said nut and diaphragm, whereby upon actuation of said screw said nut means will be moved to flex said diaphragm.

8. In a device of the character indicated, a body, a diaphragm secured thereto, gripping jaws on said diaphragm, a right and left-hand screw in said body, a nut on each said screw, and a link connecting each said screw to said diaphragm, whereby upon rotation of said screw said nuts will be caused to move relatively to each other and through said links will flex said diaphragm.

9. In a device of the character indicated, a body, a diaphragm secured thereto, screw means in said body and fixed against endwise movement, and means operable by said screw means for flexing said diaphragm in both directions.

10. In a device of the character indicated, a body member, a diaphragm secured thereto, said body member having a chamber therein, a partition in said chamber, said diaphragm being secured to said body at one side of said partition, diaphragm actuating means in said chamber at the opposite side of said partition, and means extending through said partition from said actuating means to said diaphragm for actuating the latter.

RAYMOND R. SEARLES.